US011602686B2

(12) United States Patent
Jones et al.

(10) Patent No.: US 11,602,686 B2
(45) Date of Patent: *Mar. 14, 2023

(54) NOTIFICATIONS ON GAME CONTROLLER

(71) Applicant: Google LLC, Mountain View, CA (US)

(72) Inventors: Christopher Jones, San Francisco, CA (US); Jeffrey David Yaksick, Mount Hamilton, CA (US)

(73) Assignee: Google LLC, Mountain View, CA (US)

(*) Notice: Subject to any disclaimer, the term of this patent is extended or adjusted under 35 U.S.C. 154(b) by 142 days.

This patent is subject to a terminal disclaimer.

(21) Appl. No.: 17/157,117

(22) Filed: Jan. 25, 2021

(65) Prior Publication Data
US 2021/0138339 A1 May 13, 2021

Related U.S. Application Data

(63) Continuation of application No. 16/148,726, filed on Oct. 1, 2018, now Pat. No. 10,898,793, which is a continuation of application No. 14/308,771, filed on Jun. 19, 2014, now Pat. No. 10,086,273.

(51) Int. Cl.
A63F 13/23 (2014.01)
A63F 13/20 (2014.01)
A63F 13/42 (2014.01)
A63F 13/48 (2014.01)

(52) U.S. Cl.
CPC ............. A63F 13/23 (2014.09); A63F 13/20 (2014.09); A63F 13/42 (2014.09); A63F 13/48 (2014.09)

(58) Field of Classification Search
None
See application file for complete search history.

(56) References Cited

U.S. PATENT DOCUMENTS

| 8,613,669 | B1 | 12/2013 | McCauley | |
| 9,937,415 | B1 | 4/2018 | Makuch et al. | |
| 2004/0023719 | A1 | 2/2004 | Hussain et al. | |
| 2006/0154725 | A1* | 7/2006 | Glaser | A63F 13/24 463/37 |
| 2008/0026845 | A1 | 1/2008 | Aguilar et al. | |
| 2010/0041480 | A1 | 2/2010 | Wong et al. | |
| 2011/0092282 | A1* | 4/2011 | Gary | A63F 13/87 463/31 |
| 2013/0035144 | A1 | 2/2013 | Karn | |
| 2014/0094318 | A1 | 4/2014 | Nguyen et al. | |

OTHER PUBLICATIONS

Notice of Allowance dated May 21, 2018 in U.S. Appl. No. 14/308,771.

(Continued)

Primary Examiner — Robert T Clarke, Jr.
(74) Attorney, Agent, or Firm — Kilpatrick Townsend & Stockton LLP

(57) ABSTRACT

Implementations are provided that permit a seamless activation of a game or other application on a host device from a game controller. The game may be launched on the host device in response to an activation signal that is dispatched from the game controller. The game controller may generate the activation signal or it may send such a signal to the host device for processing. The game controller may detect that an action button has been pressed and generate the activation signal in response thereto.

19 Claims, 6 Drawing Sheets

(56) References Cited

OTHER PUBLICATIONS

Notice of Allowance dated Sep. 15, 2020 in U.S. Appl. No. 16/148,726.
Office Action dated Jan. 27, 2017 in U.S. Appl. No. 14/308,771.
Office Action dated May 20, 2020 in U.S. Appl. No. 16/148,726.
Office Action dated Aug. 28, 2017 in U.S. Appl. No. 14/308,771.
Steampowered.com, "Steam Controller", retreived May 19, 2014, pp. 1-6, available at: http://store.steampowered.com/livingroom/SteamController/.

* cited by examiner

NOTIFICATIONS ON GAME CONTROLLER

CROSS-REFERENCE TO RELATED APPLICATIONS

This application is a continuation of U.S. patent application Ser. No. 16/148,726, filed Oct. 1, 2018, which is a continuation of U.S. patent application Ser. No. 14/308,771, filed Jun. 19, 2014, each of which is hereby incorporated by reference herein in its entirety.

BACKGROUND

Game controller technology has generally been developed to complement game system (e.g., a gaming console) or video game capabilities. Game controller design has also morphed from simple rectangular shapes with a directional pad and a few buttons to more ergonomic designs containing more buttons, analog joysticks, as well as other features. Features such as wireless connectivity, a speaker, a gyroscope, and a vibration capability have been added to various game controllers. Some controllers are capable of interfacing with a smartphone, tablet, and/or TV. Such game controllers are dependent on the host device to provide the gaming experience. For example, a game console is typically connected to a monitor and a wireless controller may be utilized to interface with content provided by the game console. As another example, a game controller may be utilized with a smartphone or tablet to manipulate or interface with content provided on the tablet. Portable, or handheld consoles, in comparison, do not have a physically separate game controller that interfaces with them.

SUMMARY

According to an implementation, a process of a game controller communicatively coupled to a host device may receive an indication of a notification about a game that is not currently launched on the host device. The game controller may include an action button and at least one of a directional pad, an analog controller, a shoulder button, a trigger button, and/or a controller button. An indication that the action button has been pressed may be received. An activation signal may be dispatched to the host device in response to receiving the indication that the action button has been pressed. The activation signal may cause the host device to launch the game.

A device is disclosed in an implementation that includes an action button and at least one of a directional pad, an analog controller, a shoulder button, a trigger button, and/or a controller button. The device may include a communication module that communicatively couples the device to a host device. The device may include a processor that may be configured to receive an indication of a notification about a game that is not currently launched on the host device. The processor may receive an indication that the action button has been pressed and dispatch an activation signal to the host device in response to receiving the indication that the action button has been pressed. The activation signal may cause the host device to launch the game.

In an implementation, a processor of a game controller communicatively coupled to a host device may receive an indication of a chat request. The game controller may include an action button and at least one of a directional pad, an analog controller, a shoulder button, a trigger button, and/or a controller button. An indication may be received that the action button has been pressed. An activation signal may be dispatched to the host device in response to receiving the indication that the action button has been pressed. The activation signal may cause the host device to launch a chat message application.

In an implementation, a system according to the presently disclosed subject matter includes a means for receiving, by a processor of a game controller communicatively coupled to a host device, an indication of a notification about a game that is not currently launched on the host device. The game controller may include an action button and at least one of a directional pad, an analog controller, a shoulder button, a trigger button, and/or a controller button. The system may include a means for receiving an indication that the action button has been pressed and a means for dispatching an activation signal to the host device in response to receiving the indication that the action button has been pressed. The activation signal may cause the host device to launch the game.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
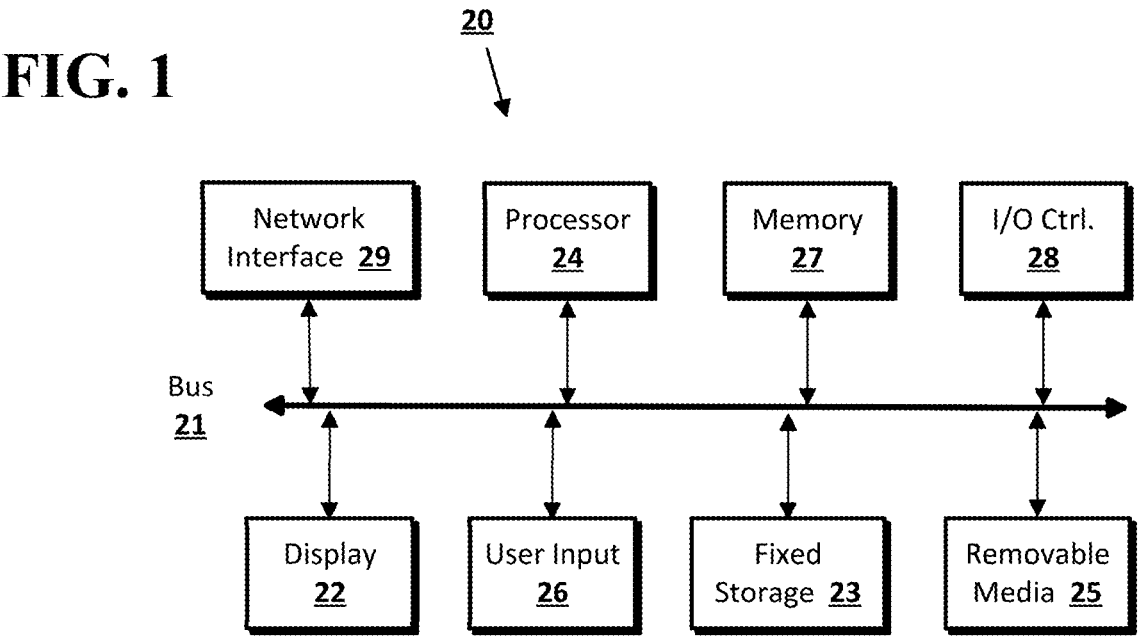
FIG. 1 shows a computer according to an implementation of the disclosed subject matter.

A device and method are disclosed for a game controller that provides notifications for a game invitation, a chat message, an indication that a user's high score has been beaten, or the like. The notification may be provided by an audio and/or visual cue on the game controller. The game controller, in an implementation, may be utilized to activate one or more host devices (e.g., a television monitor, a tablet, a smartphone, etc.) if the user presses an action button on the controller or accepts the notification. In some configurations, a user may select which host device will launch the application associated with the notification. For example, if a television monitor and a tablet are in the same room as the game controller, a user may elect to launch the application associated with the notification on the tablet and not the television monitor in response to the notification received at the game controller.

A user may accept a notification to pair the user's account with the specific game controller. For example, information associated with the user's account may be utilized to log a user directly into a video game instead of needing the user to manually enter a username and password. The game controller may include computer readable memory that may store one or more user preferences for one or more users. Further, it may store an indication of user account that is associated with a unique user and more than one user account may be stored on the game controller's memory. For example, a user's preferences may include game specific key bindings, host device settings (e.g., display brightness, volume, etc.), game controller settings, user information (e.g., user name, password, etc.). Game controller settings may include, for example, video/audio cue(s) associated with specific notifications or specific instructions to perform in response to a received notification. The game controller may store a particular key combination that uniquely identifies the user as the one operating the controller. A user may enter the key combination into the controller (e.g., a sequence of one or more of an analog stick, a direction pad, a button, etc.) when the user wishes to utilize features available only when the user is logged into the controller (e.g., automatically logging a user into a game specifically as a particular user). The game controller may utilize a user's account and/or preferences to automatically log a user into a particular game.

The game controller may include a display that can augment the functionality of the controller. For example, the game controller display may show an image (e.g., an icon or avatar) of the sender or originator of the notification (e.g., a game invitation). In some configurations, the user of the game controller may switch host devices utilizing a display. For example, a user may be prompted to select a host device in the game controller's display. A selection of a host device by the game controller may switch the display from one monitor to another. Similarly, the source may be switched. A video game may be installed on two host devices such as a user's smartphone and a tablet connected to television. If the smartphone is the default host device and the user selects the tablet from the game controller, the tablet may be activated, the game launched thereon, and displayed on the television.

Figure 3:
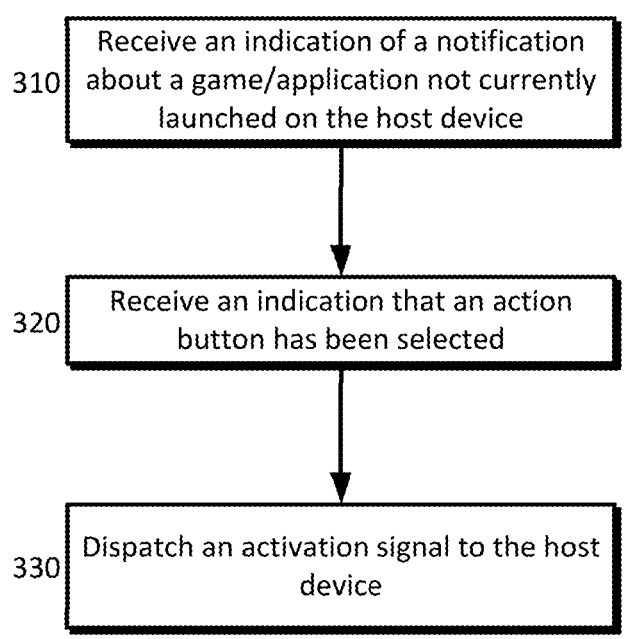
FIG. 3 is an example process for dispatching an activation signal to a host device as disclosed herein.
Figure 4:
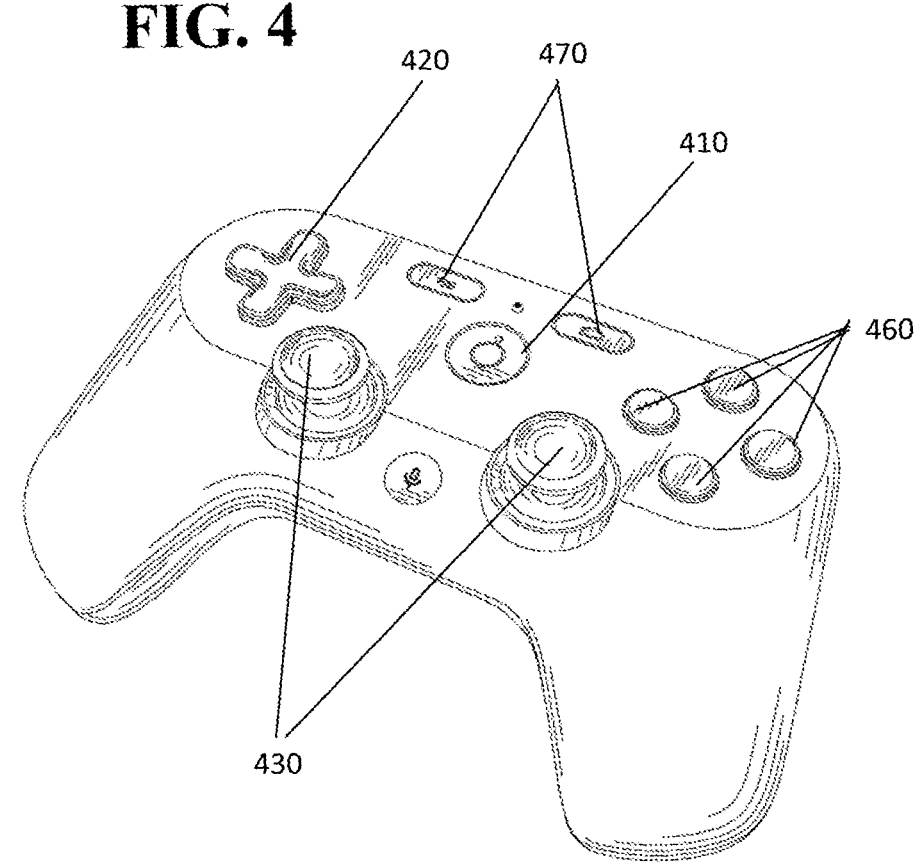
FIG. 4 is an example of a game controller as disclosed herein.
Figure 4:
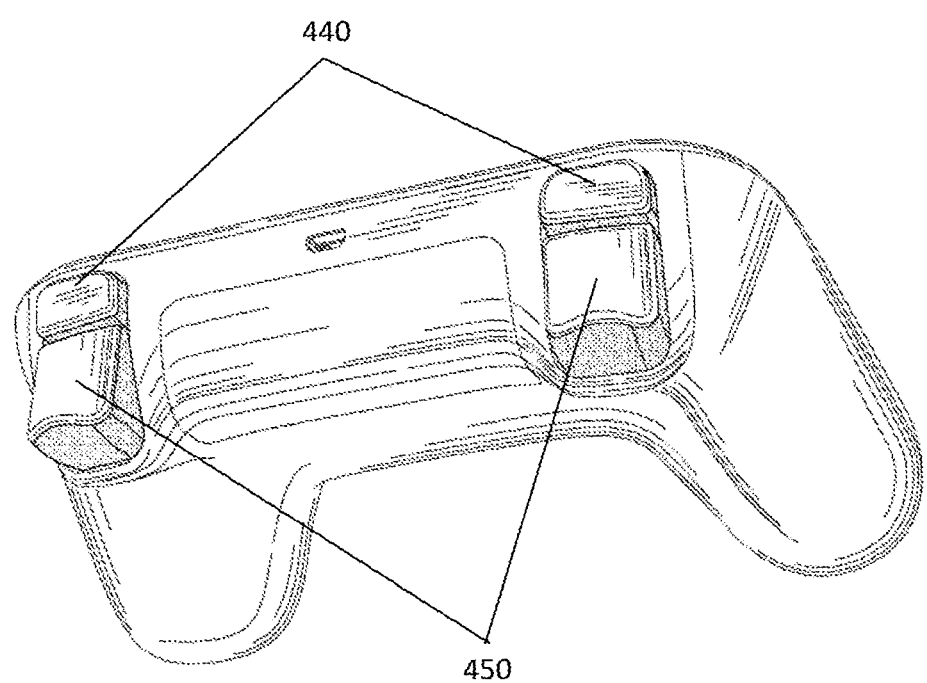

According to an implementation, an example of which is provided in FIG. 3, a processor of a game controller that is communicatively coupled to a host device may receive an indication of a notification about a game or other application that is not currently launched on the host device at 310. An example of a game controller as disclosed herein is shown in FIG. 4. In an implementation, the game controller may include an action button 410 and at least one of a directional pad 420, an analog controller or joystick 430, a shoulder button 440, a trigger button 450, a gameplay button 460, and/or a controller button 470. The controller button 470 may be associated with specific functions in the context of a gaming platform. For example, a controller button 470 may be a "back" button or a "home" button that removes the user's last action or navigation (for the "back" button) or navigates the user to a home page or start location (for the "home" button). The controller may be associated with a variety of hardware components and circuitry necessary for the operation of the buttons, analog controller, and directional pad. It may contain, for example, a processor and a computer readable storage medium. In some configurations, the controller may include a display, a speaker, a microphone, and one or more indicator lights. The game controller may be dependent upon a host device for interaction with a game, a web browser, a user interface. The game controller, for example, may not be capable of displaying a video game in a display on the game controller. If a display is incorporated in the game controller, it may display features specific to the game controller (e.g., a saved file selection or user selection) or basic features related to a video game (e.g., a score, simple text message, a picture, a mini-game, etc.).

The game controller may be communicatively coupled to the host device. For example, the game controller may be paired or associated with the host device by a variety of connection protocols such as USB, Bluetooth, Wi-Fi, etc. The host device may separately communicate with a network such as a home or local network by Wi-Fi or the like. For example, if the host device is off or otherwise not communicating with the network or game controller, the game controller may receive data communications via a direct or wireless connection to the network.

The host device may be, for example, a tablet, a smartphone, a TV connected to a game system, etc. The host device may have the hardware and software necessary to cause display of a video game, electronic interaction (email, chat messaging, invitations, web browsing, etc.), and/or application upon execution of instructions stored on computer readable media of the host device. The storage medium containing the instructions for execution thereof may be connected to or associated with the host device. For example, a video game may be played by inserting a DVD (storage medium) into a game console (e.g., host device) and the game console in such a case may contain instructions about how to respond to and execute instructions contained on the DVD.

The game controller may be paired or associated with one or more host devices by initiating a scan from the host device. For example, a host device may scan for compatible Bluetooth devices and detect a game controller that is communicating over Bluetooth. The host device may ask a user if the user would like to pair the game controller with the host device. Once a user elects to pair or associate the game controller with the host device, the host device may store an indication of the game controller so that subsequent pairings may occur automatically or without requiring a prompt from a user. The game controller may store an indication of one or more host devices with which it has paired on computer readable memory. In some instances, a user may pair the controller to more than one host device. For example, a user may pair the game controller with a tablet and separately with a game console. In the event that both devices are active, one of them may be designated as a master and the other a slave based on, for example, which one was first paired with the game controller. The master device may be the default device with which the game controller pairs. A display on the controller may permit a user to toggle the pairing between the host devices. For example, upon powering on the game controller, it may pair with the master device which can be a tablet. However, a user may select for the game controller to interact or pair with a slave device such as a game console connected to a monitor.

The indication of a notification about a game that is not currently launched on the host device may refer to an audio and/or visual cue provided by the game controller. For example, the notification may be a game invitation from a user's friend. The host device may receive an invitation and dispatch the indication to the game controller or the invitation may be received by the game controller's connection to the Internet. An indication of the notice may be, for example, a sound that is played by a speaker on the game controller and/or illumination of one or more LEDs. If the game controller contains a display, the notification may be displayed therein. The indication of the notification may persist until a user adopts an action related to the notification with the game controller or with the host device. For example, if the notification is a game invitation and the user accepts the game invitation via a tablet (e.g., a host device), the indication of the notification on the game controller may cease.

The notification may be about an application, such as a video game, that is not currently launched on the host device. The game, however, may be stored in RAM or other transient memory of the host device. A game may be deemed currently launched if the game is actively being played on the host device and/or being displayed on the host device's monitor. An application or video game that is loaded or stored in short term or transient memory and not displayed on the host device's display or a display connected to the host device may be deemed as not currently launched on the host device. The notification may indicate a leaderboard status change such as a user's high score on Game XYZ has been passed. If the user presses an action button, the game may be launched on the host device so that the user may attempt to reclaim the leaderboard status. The notification may differ from typical communication between a game controller and a host device because it may contain an indication or information about a specific game that is not currently launched on the host device. For example, the notification may refer to a game invitation, a chat request for a specific game, or the like, which may not be communicated as part of a wireless protocol or communication between the game controller and the host device in lieu of such a request being made.

Returning to FIG. 3, an indication that the action button has been pressed or otherwise selected may be received at 320. The action button may be a separate button as shown in the example of a game controller provided in FIG. 4. An action button may refer to a physical button, a virtual button (e.g., one that can be rendered on a touch screen), or other input capable of responding to the indication of the notification. In the example process shown in FIG. 3, the action button is a separate physical button.

When this button is pressed, the processor may register the input and communicate an indication thereof to the host device. The communication that the action button has been pressed may be a command indicating as much or it may contain instructions for the host device. Thus, an activation signal may be dispatched to the host device in response to receiving the indication that the action button has been pressed at 330. The activation signal may cause the host device to launch an application (e.g., a video game). The game controller, for example, may contain computer readable memory that may convert the combination of the indication of the notification and the indication of the action button being pressed into one or more instructions for the host device. The notification may be associated with an identifier for the application (e.g., video game) that is the origin of the invitation and/or an identifier regarding the nature of the notification (e.g., a game invitation, a chat message, originator of the invitation, etc.). Computer readable memory of the game controller may contain a table, for example, that contains each of the identifiers and corresponding instructions for the game controller. The table may be dynamically updated.

Figure 5:
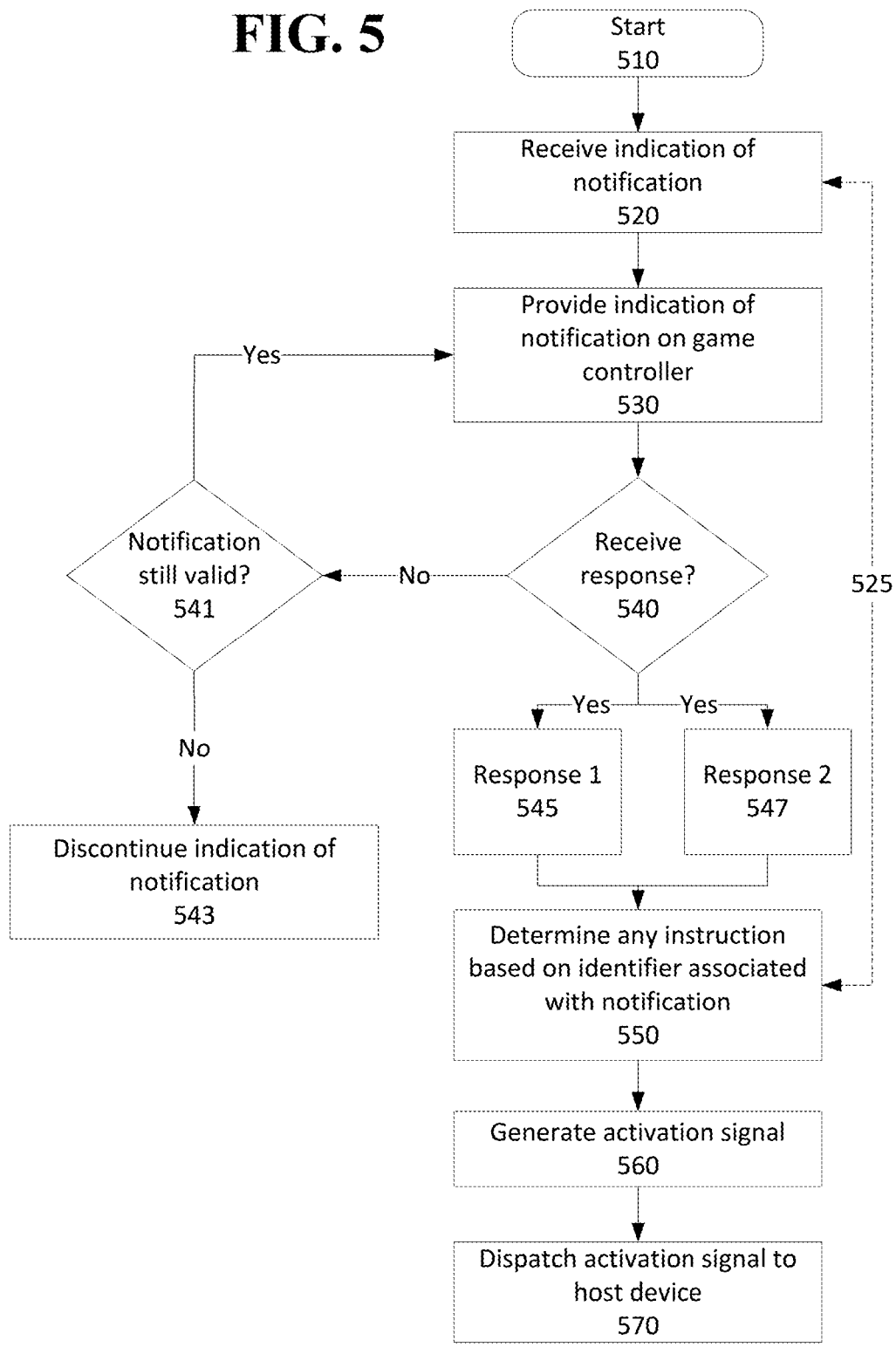
FIG. 5 shows an example of a process performed by the game controller's hardware as disclosed herein.

FIG. 5 provides an example process carried out by the game controller's hardware. Initially 510, the game controller may receive an indication of a notification from a host device or over a wireless connection at 520 as described earlier. In some configurations, the indication may be associated with an identifier and the game controller may compare the identifier to those present in a table to determine any instructions that may be executed at stage. For example, if the notification contains an identifier for Game XYZ and a second identifier for a game invitation, the processor of the game controller may determine that for a game invitation for Game XYZ requires a particular color and/or blink pattern to be displayed using LEDs according to the user preferences of the user to whom the game invitation was sent. The indication of the notification may be provided on the game controller at 530. In this example, LEDs may be illuminated in the specified color.

The game controller may determine whether a response has been received at 540. If no response has been received after a predetermined amount of time, the game controller may be determined if the notification is still valid at 541. For example, the game controller may send confirmation signal back to the host device or device that originated the notification and await a response from that device. If the host device responds that the notification is no longer valid (e.g., the game invitation has expired or the user accepted the invitation on a separate device), then the game controller may discontinue providing the indication of the notification. One or more responses may be received at 545 and 547. For example, a user may accept a game invitation by briefly pressing (e.g., less than a three second press) the action button at 545. A user may decline or dismiss the indication of the notification at 547 by pressing the action button for an extended period of time (e.g., greater than or equal to three seconds). Other forms of action buttons may be employed as well. An action button may be a virtual button on a touch-sensitive display on the game controller, a user may activate one virtual button for one response and a second button for a different response. For example, the notification may include or be the opportunity to engage in a chat message conversation with another user. The initial message may be received as a notification as described herein and the user may respond to the chat message using a virtual keyboard that appears on the display of the game controller.

The response, at least one identifier, and the indication of the notification may be compared to a table containing instructions for one or more responses for one or more applications (e.g., video games) and/or notifications or indications thereof. For example, if the notification is a game invitation for Game XYZ and a user has accepted the invitation by briefly pressing the action button, the game controller may generate an activation signal at 560. Generating the activation signal may include identifying or selecting one or more instructions that are to be provided to the host device. In some configurations, the game controller may store a record of previously and currently connected host devices. The instructions may be customized for a particular host device. For example, a host device may utilize a particular operating system that requires instructions to be formatted a specific way. The activation signal may, for example, instruct the host device to turn on or wake up if it is inactive, launch Game XYZ, and accept the invitation to the game, thereby initiating gameplay with the appropriate parties for Game XYZ at 570. The game controller may dispatch the activation signal to the host device directly or indirectly. For example, if the host device and the game controller are present on the same network, the game controller may send the activation signal to the host device indirectly through the network.

Figure 6:
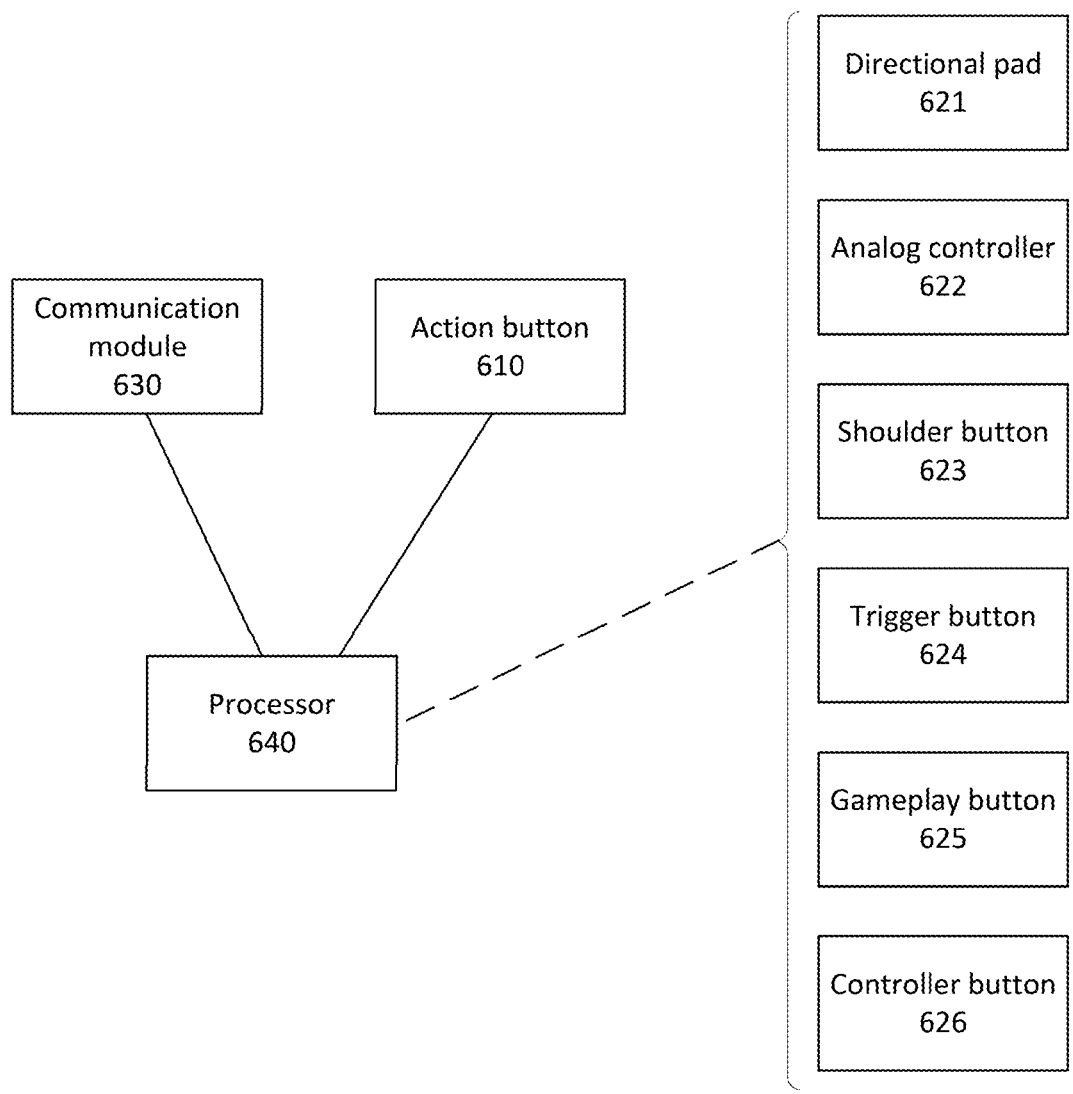
FIG. 6 shows an example of a game controller device according to an implementation disclosed herein.

In an implementation, a device is provided such as the example shown in FIG. 6. The device may include an action button 610 and at least one of a directional pad 621, an analog controller (e.g., joystick) 622, a shoulder button 623, a trigger button 624, a gameplay button 625, and/or a controller button 626. The device may include a communication module 630 (e.g., a Wi-Fi chipset, a Bluetooth chipset, a USB chipset) that can communicate instructions to and from a host device. The action button 610 of the controller may be a virtual button of a display of the device in some configurations. The action button 610 may be associated with one or more LEDs, a microphone, and/or a speaker. The device may include a processor 640 that is configured to receive an indication of a notification about a game that is not currently launched on the host device as described earlier. The processor 640 may receive an indication that the action button has been pressed and dispatch an activation signal to the host device. The activation signal may cause the host device to launch the game or application that is related to the notification.

Figure 7:
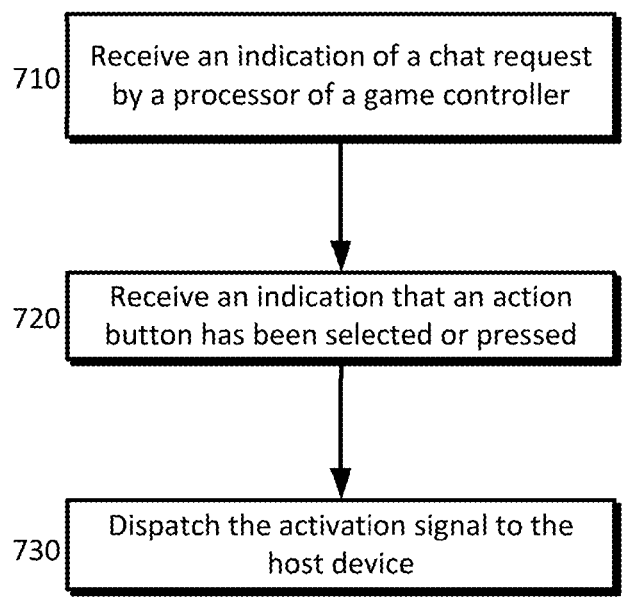
FIG. 7 is an example process to receive a chat request by a game controller and dispatch an activation signal to a host device as disclosed herein.

In an implementation, an example of which is provided in FIG. 7, a game controller's processor may receive an indication of a chat request at 710. The game controller may be communicatively coupled to a host device as described earlier. The game controller may include firmware that, for example, interprets key presses and/or signals received from the host device. For example, if the game controller includes a vibration capability, during game play the game controller may receive a signal to vibrate the controller. The indication of the chat request may be received by the controller through, for example a communication module (e.g., a Bluetooth chipset). The chat request may be indicated on the game controller with an audio and/or visual cue. The audio/video cue for the chat request may be configured, for example based on the origin of the chat request (e.g., a different color LED may be utilized for different users sending the chat request) and/or the application making the chat request. If the chat request is from Game XYZ from a user A, then a blue LED may be illuminated and two beeps may be emitted from the game controller's speaker. If the chat request is from Game ABC and from user A, then a green LED may be illuminated and two beeps may be emitted. If the chat request is from Game ABC and from user B, then a green LED may be illuminated and a single chime may be emitted.

An indication that the action button has been pressed may be received at 720. The game controller may generate, based on the indication received from the host device and the action button being pressed, an activation signal that communicates a response to the host device. The response, for example, may be to ignore or decline the chat request. The activation signal may be dispatched to the host device at 730. The activation signal may, for example, cause the host device to launch a chat message application. For example, the chat request may have originated from inside Game XYZ. The activation signal may cause the host device to activate (e.g., wake up), launch Game XYZ, log a user into Game XYZ using credentials stored on computer readable memory of the game controller, and open a chat window with the person who initiated the chat request.

Although various examples provided herein have been described and shown with respect to specific notifications, such as a chat request, high score notification, and the like, it will be understood that a similar process may be used for any other notification or request type as disclosed herein. More generally, the devices and techniques disclosed herein may be used to provide any suitable notification from a game system on a game controller as disclosed herein.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
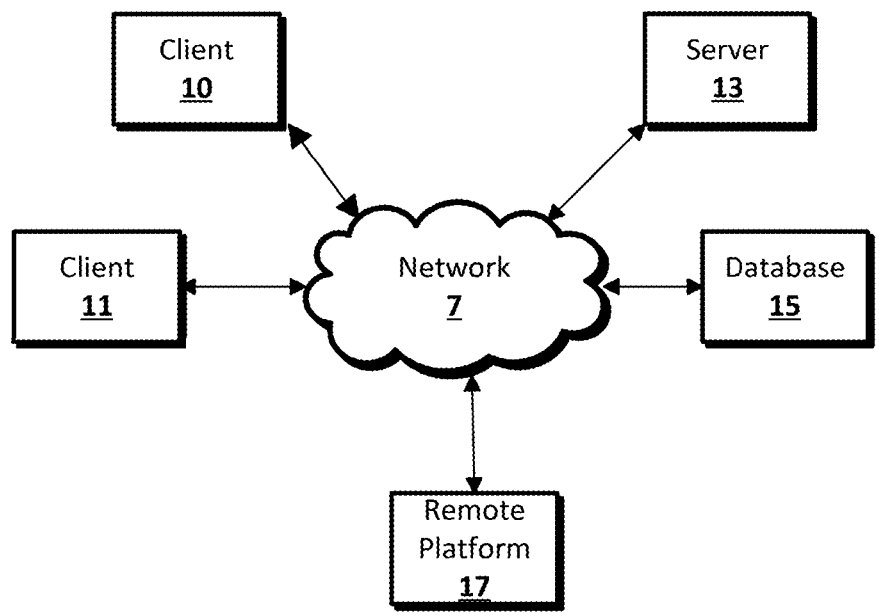
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A computer-implemented method, comprising:

receiving, by a processor of a game controller communicatively coupled to a host device, a notification about a game installed on the host device;

causing an indicator light of the game controller to illuminate in a first indication configuration;

determining that an action button on the game controller has not been pressed within a first predetermined amount of time and determining that the action button on the game controller has been pressed within a second predetermined amount of time, wherein pressing the action button on the game controller transmits a first activation signal to the host device that causes a first game to be launched on the host device; and discontinuing, based on an indication that the action button on the game controller has been pressed within the second predetermined amountof time, the indicator light from illuminating in the first indication configuration.

2. The computer-implemented method of claim 1, wherein the notification is associated with the game that is not currently launched on the host device.

3. The computer-implemented method of claim 1, further comprising transmitting a response to the host device that dismisses the notification based on the indication that the action button on the game controller has been pressed within the second predetermined amount of time.

4. The computer-implemented method of claim 1, further comprising:

determining whether the indicator light that is illuminating in the first indication configuration is valid by transmitting a confirmation signal to the host device regarding the notification;

receiving a response from the host device that the notification is no longer valid; and inhibiting the indicator light from illuminating in the first indication configuration.

5. The computer-implemented method of claim 1, wherein the notification comprises a game invitation and an image of a first originator, and wherein the image of the first originator is presented on a display of the game controller.

6. The computer-implemented method of claim 1, further comprising:
receiving an indication of a different host device;
causing a prompt to be presented in a display that shows a representation of the host device and a representation of the different host device; and
receiving a selection of the host device.

7. The computer-implemented method of claim 1, wherein the game controller further comprises a display that is touch-sensitive and wherein the method further comprises receiving, by the display, an indication of the first activation signal.

8. The computer-implemented method of claim 1, wherein the first activation signal further causes the host device to be activated.

9. The computer-implemented method of claim 1, further comprising:
receiving an indication of a chat request;
causing, based on the indication of the chat request, the indicator light to illuminate in a second indication configuration that is different than the first indication configuration;
receiving an indication that the action button has been pressed at a second time; and
transmitting, based on the action button being pressed at the second time, a second activation signal to the host device in response to receiving the indication that the action button has been pressed at the second time, wherein the second activation signal causes a chat message application to be launched on the host device.

10. A controller device, comprising:
an indicator light;
an action button;
a communication interface configured to communicatively couple a game controller device to a host device; and
a processor that:
receives a notification about a game installed on the host device;
causes the indicator light of the game controller to illuminate in a first indication configuration;
determines that the action button on the game controller has not been pressed within a first predetermined amount of time and determines that the action button on the game controller has been pressed within a second predetermined amount of time, wherein pressing the action button on the game controller transmits a first activation signal to the host device that causes a first game to be launched on the host device; and
discontinues, based on an indication that the action button on the game controller has been pressed within the second predetermined amountof time, the indicator light from illuminating in the first indication configuration.

11. The controller device of claim 10, wherein the notification is associated with the game that is not currently launched on the host device.

12. The controller device of claim 10, wherein the processor transmits a response to the host device that dismisses the notification based on the indication that the action button on the game controller has been pressed within the second predetermined amount of time.

13. The controller device of claim 10, wherein the processor further:
determines whether the indicator light that is illuminating in the first indication configuration is valid by transmitting a confirmation signal to the host device regarding the notification;
receives a response from the host device that the notification is no longer valid; and
inhibits the indicator light from illuminating in the first indication configuration.

14. The controller device of claim 10, wherein the notification comprises a game invitation and an image of a first originator, and wherein the image of the first originator is presented on a display of the game controller.

15. The controller device of claim 10, wherein the processor further:
receives an indication of a different host device;
causes a prompt to be presented in a display that shows a representation of the host device and a representation of the different host device; and
receives a selection of the host device.

16. The controller device of claim 10, further comprising a display that is touch-sensitive and wherein the processor further receives, by the display, an indication of the first activation signal.

17. The controller device of claim 10, wherein the first activation signal further causes the host device to be activated.

18. The controller device of claim 10, wherein the processor further:
receives an indication of a chat request;
causes, based on the indication of the chat request, the indicator light to illuminate in a second indication configuration that is different than the first indication configuration;
receives an indication that the action button has been pressed at a second time; and
transmits, based on the action button being pressed at the second time, a second activation signal to the host device in response to receiving the indication that the action button has been pressed at the second time, wherein the second activation signal causes a chat message application to be launched on the host device.

19. A non-transitory computer-readable medium containing computer executable instructions that, when executed by a processor, cause the processor to perform a method, the method comprising:
receiving, by the processor of a game controller communicatively coupled to a host device, a notification about a game installed on the host device;
causing an indicator light of the game controller to illuminate in a first indication configuration;
determining that an action button on the game controller has not been pressed within a first predetermined amount of time and determining that the action button on the game controller has been pressed within a second predetermined amount of time, wherein pressing the action button on the game controller transmits a first activation signal to the host device that causes the first game to be launched on the host device; and
discontinuing, based on an indication that the action button on the game controller has been pressed within the second predetermined amountof time, the indicator light from illuminating in the first indication configuration.

* * * * *